US005333450A

United States Patent [19]

Blendinger et al.

[11] Patent Number: 5,333,450

[45] Date of Patent: Aug. 2, 1994

[54] APPARATUS FOR ADJUSTING THE WORKING FLUID PRESSURE

[75] Inventors: Herbert Blendinger, Haibach; Günter Fertig, Wertheim; Armin Stellwagen, Lohr, all of Fed. Rep. of Germany

[73] Assignee: Mannesmann Rexroth GmbH, Lohr, Fed. Rep. of Germany

[21] Appl. No.: 986,337

[22] Filed: Dec. 7, 1992

[30] Foreign Application Priority Data

Dec. 7, 1991 [DE] Fed. Rep. of Germany ....... 4140423

[51] Int. Cl.[5] .............................................. F16D 31/02

[52] U.S. Cl. ....................................... 60/459; 91/517; 91/459; 91/461

[58] Field of Search ................. 60/420, 421, 426, 427, 60/459; 91/517, 511, 512, 518, 461, 459

[56] References Cited

U.S. PATENT DOCUMENTS 3,927,603 12/1975 Bernhoft ........................... 91/461 X
4,508,013 4/1985 Barbagli ............................ 91/518 X
4,708,596 11/1987 Palm et al. ......................... 60/459 X
4,718,329 1/1988 Nakajima et al. ................ 91/459 X
4,845,948 7/1989 Tha et al. .......................... 91/518 X
4,938,023 7/1990 Yoshino ............................ 91/518 X

FOREIGN PATENT DOCUMENTS 3709504 10/1988 Fed. Rep. of Germany .

OTHER PUBLICATIONS

"o+p-ölhydraulik und pneumatik", vol. 29 (1985), No. 2, pp. 80–84.

*Primary Examiner*—Edward K. Look
*Assistant Examiner*—Hoang Nguyen
*Attorney, Agent, or Firm*—Cushman, Darby & Cushman

[57] ABSTRACT

An apparatus for adjusting the pressure of working fluid provided to the load or user via a hydraulically actuatable control valve is provided. The apparatus includes a comparator that compares a given or desired control pressure for the control valve with the predominant present load pressure. The resulting pressure differential is used to re-adjust the control valve or to re-adjust a pressure compensator positioned upstream of the control valve with respect to the direction of the flow of working fluid flowing to the user.

7 Claims, 6 Drawing Sheets

APPARATUS FOR ADJUSTING THE WORKING FLUID PRESSURE

FIELD OF THE INVENTION

The present invention is directed to an apparatus for adjusting the working fluid pressure the working fluid being fed to the hydraulic load via a hydraulically actuatable control valve.

BACKGROUND OF THE INVENTION

Commonly, the adjustment of the working fluid pressure is achieved by means of a pressure valve relieving the excessive pressure to the reservoir. The hydraulic fluid flowing through the pressure valve deteriorates the efficiency of the hydraulic system. In addition, the hydraulic fluid discharged to the reservoir is heated by throttling. Thus, an additional cooling device is necessary.

SUMMARY OF THE INVENTION

It is an object of the invention to facilitate the pressure adjustment of the present hydraulic system and at the same time to minimize the losses caused by the pressure adjustment.

In accordance with one aspect of the present invention an apparatus for adjusting the pressure of the working fluid supplied to the load or user via a hydraulically actuatable control valve is provided comprising comparator means for comparing a given control pressure for the control valve determining the desired value for the load pressure with the actual load pressure, wherein the resulting pressure differential forms a signal for adjusting said control valve.

In accordance with another aspect of the present invention an apparatus is provided for adjusting the pressure of the working fluid supplied to the hydraulic load or user means via a hydraulically actuatable control valve, the working fluid for the hydraulic load or user means being supplied to the control valve via a pressure compensator, one control side of which being connected to pump pressure and the other control side of which being connected to load pressure, the apparatus comprising comparator means for comparing a set or given control pressure for the pressure compensator determining the desired value for the load pressure with the present load pressure, the resulting pressure differential constituting a signal for adjusting said control valve.

Inasmuch as the control pressure for the adjustment of the control valves is at the same time a measure for the pressure adjustment and the correction signal obtained from the comparator means is superimposed on the control pressure directly applied to the control valve a pressure control free from losses is achieved without having to discharge large amounts of working fluid to the reservoir. A pressure valve for adjusting the working pressure can completely be omitted. The same applies the control of an input pressure compensator using the comparator means.

BRIEF DESCRIPTION OF THE DRAWINGS

Other features and advantages of the present invention will become more apparent by reading the following detailed description of preferred embodiments with reference to the accompanying drawings, in which.

DETAILED DESCRIPTION OF PREFERRED EMBODIMENTS

Figure 1A:
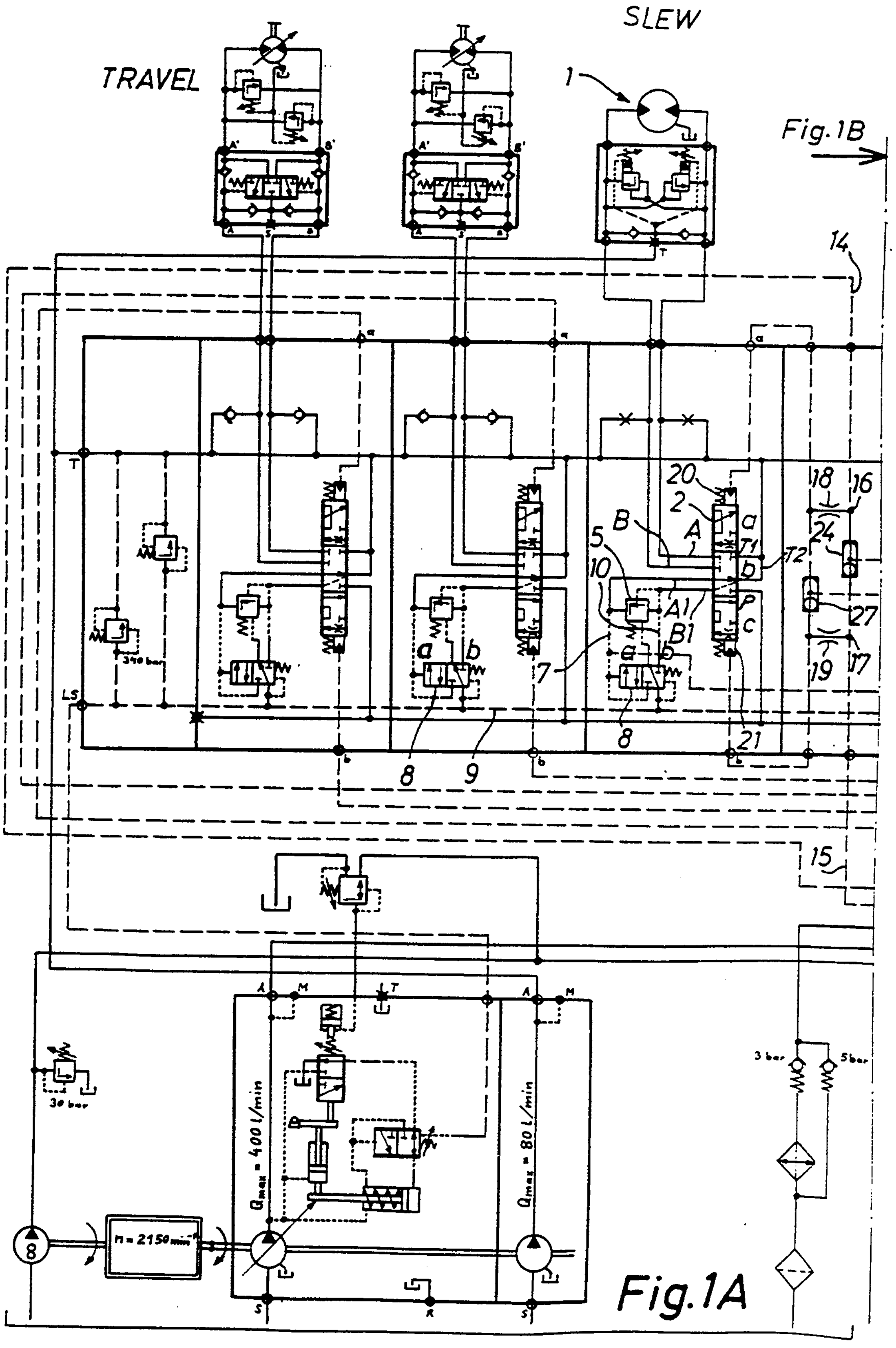
FIGS. 1A and 1B together show a circuit diagram of an excavator control in which the pressure adjustment is effected by the control position of the control valve.
Figure 1B:
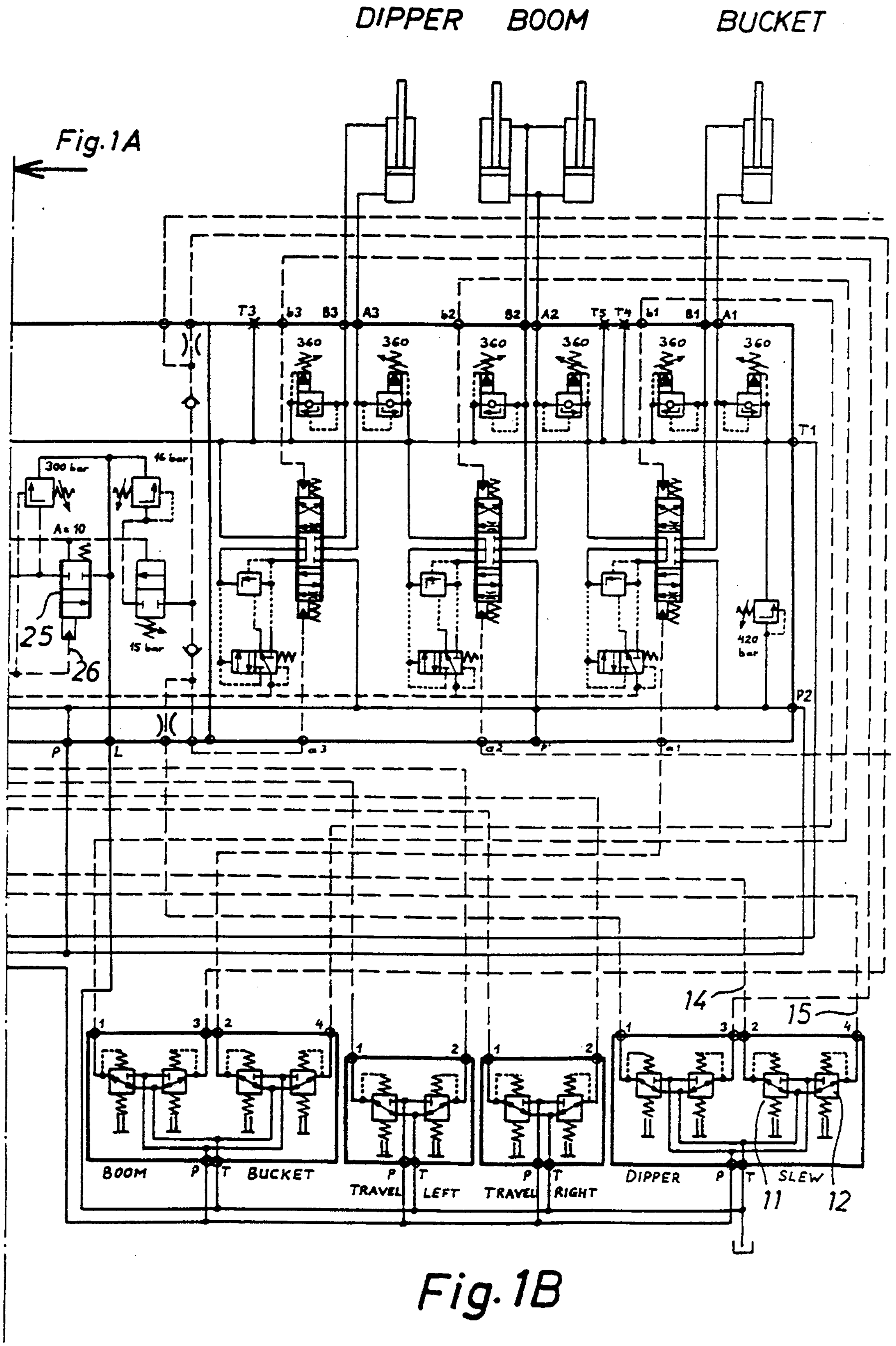

In FIG. 1, the motor 1 of the slew of the excavator (not shown) is controlled by the hydraulically operated control valve 2. The control valve 2 is a 7-way directional control valve with three switching positions a, b, and c, the transition from one switching position to another being continuous.

The control valve 2 comprises a pump port P, two reservoir ports T1, T2, two working (or load) ports A, B and two bypass ports A1, B1. Bypass port B1 connected to the pump port P in the switching position range a and c and thus determining the flow cross section of the control valve 2 is connected to the input of a pressure compensator 5. Depending on the switching position of the control valve 2, bypass port A1 connects either working port A or working port B to the output of the pressure compensator 5. At the output of the pressure compensator thus the working or load pressure of the slew motor is present. This pressure also acts via control line connection 7 on one control side of a 4-way switching valve 8 having switching positions a and b. The opposite control side of the switching valve 8 is loaded by a compression spring and also by the control pressure present in a control line 9. Control line 9 is connected to other loads (or users) such as boom, dipper, bucket, and travel, with which further switching valves are associated.

In switching position a the switching valve 8 connects the control line 7 in which the load pressure of the slew 1 is present with the control side of the pressure compensator 5 comprising the reset spring. In this switching position, also control line 10 is connected to control line 9.

In the switching position b as shown switching valve 8 connects control line 9 with the control side of pressure compensator 5 on the side of the spring while the other two ports are closed in this switching position of switching valve 8. Thus, if the load pressure of the slew 1 is larger than the control pressure present in control line 9, the switching valve 8 switches into switching position a in which then the higher load pressure is also present in control line 9 and is thus passed to the other switching valves of the further loads. If the load pressure of the slew 1 is smaller than the control pressure present in control line 9 corresponding to the load pressure of another user operationally connected to control line 9, then switching valve 8 switches into switching position b as shown in which the control side of the pressure compensator 5 on the side of the spring is connected to (and controlled by) the higher load pressure.

The control of the control valve 2 is effected hydraulically by means of control valves 11, 12 in the form of pressure control valves. According to the pressure adjustment of one of the control valves the control spool of control valve 2 moves more or less against the force of the centering and control springs from its center position b as shown into its control positions a or c and thereby opens an accordingly sized flow cross section for the working fluid flowing to the slew. The control fluid transmitting the control pressure for positioning the control spool is passed through control lines 14, 15. At junctions 16, 17 the control fluid flows via throttles 18, 19 to the control chambers 20, 21 of control valve 2 as well as via shuttle valve 24 to the control chamber on the side of the spring of a proportional valve 25. The opposite control chamber of the proportional valve 25 is connected to the output side of the pressure compensator 5 via a control line 26 in which the respective load pressure is present.

Proportional valve 25 is formed as a 2-way directional valve, the input of which is connected via a shuttle valve 27 to the respective acting control pressure downstream (behind) the throttles 18, 19, and the output of which is connected to the reservoir. In the open position of the proportional valve 25 control fluid flows from the respective controlled control side of control valve 2 to the reservoir such that between the respective throttle 18, 19 and the control valve an accordingly low control pressure appears as compared to upstream of the throttles 18, 19.

As a consequence, the flow cross section opened by the control spool of the control valve 2 is reduced and accordingly less working fluid flows to the slew which results in reducing the torque given off by the slew.

As soon as the load pressure acting on the slew and thus also acting on the corresponding control side of the proportional valve 25 reaches a value which corresponds to the value present on the opposite control side and set at the control device, the control pressure closes the proportional valve 25 to an extent that the decreased control pressure acting on the control side of the control valve keeps the control spool in an open position in which the load pressure determined by the control pressure at the control device is maintained. Herein the proportional valve 25 constitutes an adjustable throttle which together with the respective fixed throttle 18, 19 provides the intermediate pressure which determines directly at the control valve 2 the open cross section thereof corresponding to achieve the load pressure or torque, respectively, set at the control device.

Since the control pressure required for controlling the control valve 2 is considerably less than the given load pressure, the opposing control surfaces of the proportional valve 25 are dimensioned with respect to each other such that the required ratio of control pressure to load pressure or torque, respectively, at the slew 1 is provided. If for example the maximum control pressure is 30 bar and the required maximum load pressure is 300 bar, then the control surfaces at the proportional valve 25 must have a ratio of 1:10 so that the demanded or required load pressure or torque, respectively, can be adjusted by a respective control pressure.

Figure 2A:
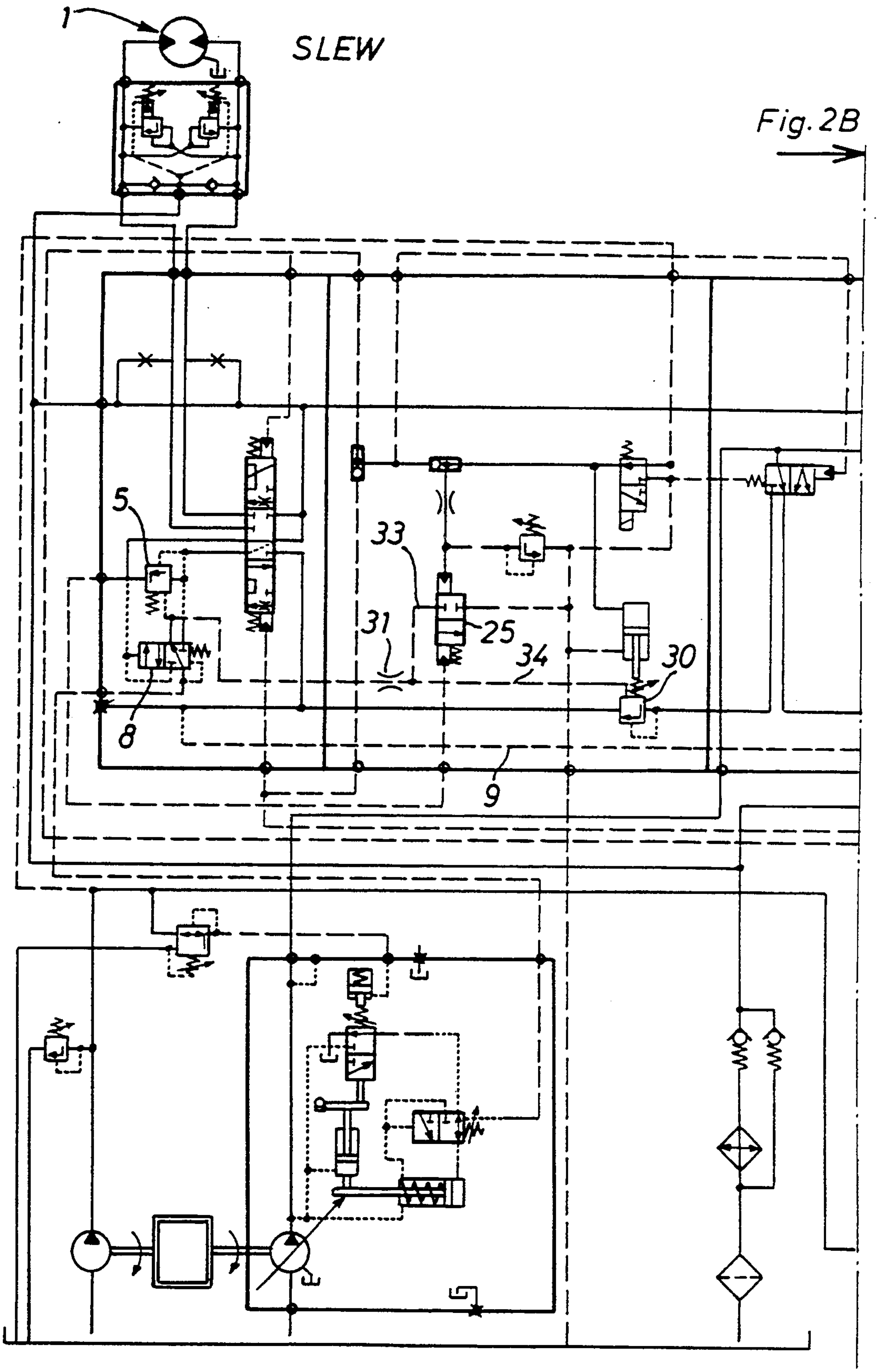
FIGS. 2A and 2B together show a circuit diagram of an excavator control in which the pressure adjustment is effected by the (closed loop) control position of the input pressure compensator.
Figure 2B:
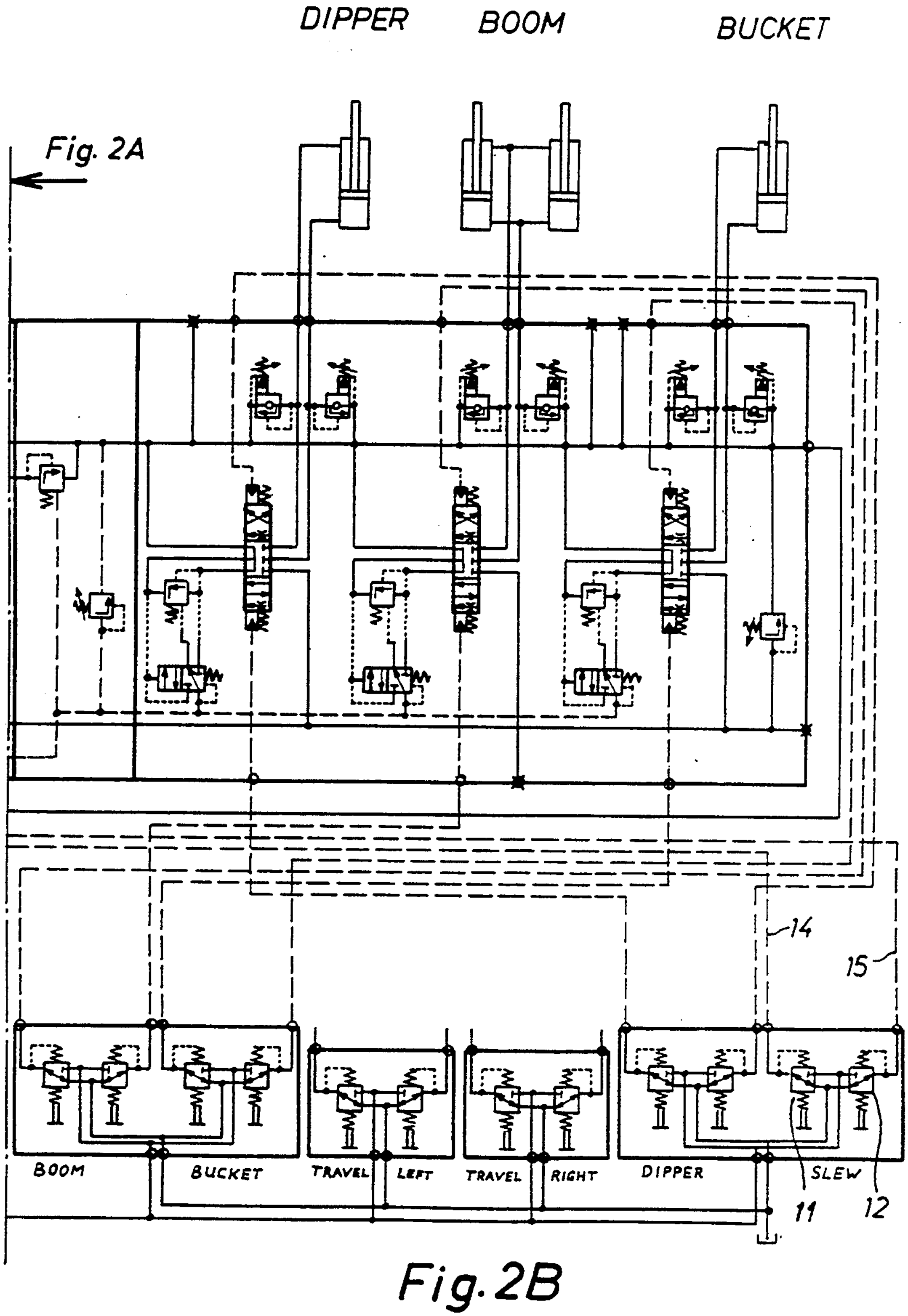

The embodiment of FIG. 2 differs from the embodiment of FIG. 1 only inasmuch as instead of control valve 2 now a pressure compensator 30 upstream of the control valve 2 limits the amount of working fluid for obtaining the desired load pressure or torque, respectively. The control pressure acting at control valve 2 and determined by the control signal generator means 11 or 12 is not changed thereby.

The control fluid under load pressure is passed via a fixed throttle 31 to the side of the spring of the pressure compensator 30. A control line 33 is connected to control line 34 between this fixed throttle 31 and the pressure compensator 30 and leads to proportional valve 25. Depending on the amount of opening of the proportional valve 25 and together with the fixed throttle 31 the control pressure at the pressure compensator 30 is controlled such that the amount of working fluid flowing through control valve 2 to the slew 1 reaches such a value that the load pressure or torque, respectively, determined by the control device 11, 12 as the control pressure and acting on one control side of the proportional valve 25 is obtained.

Figure 3A:
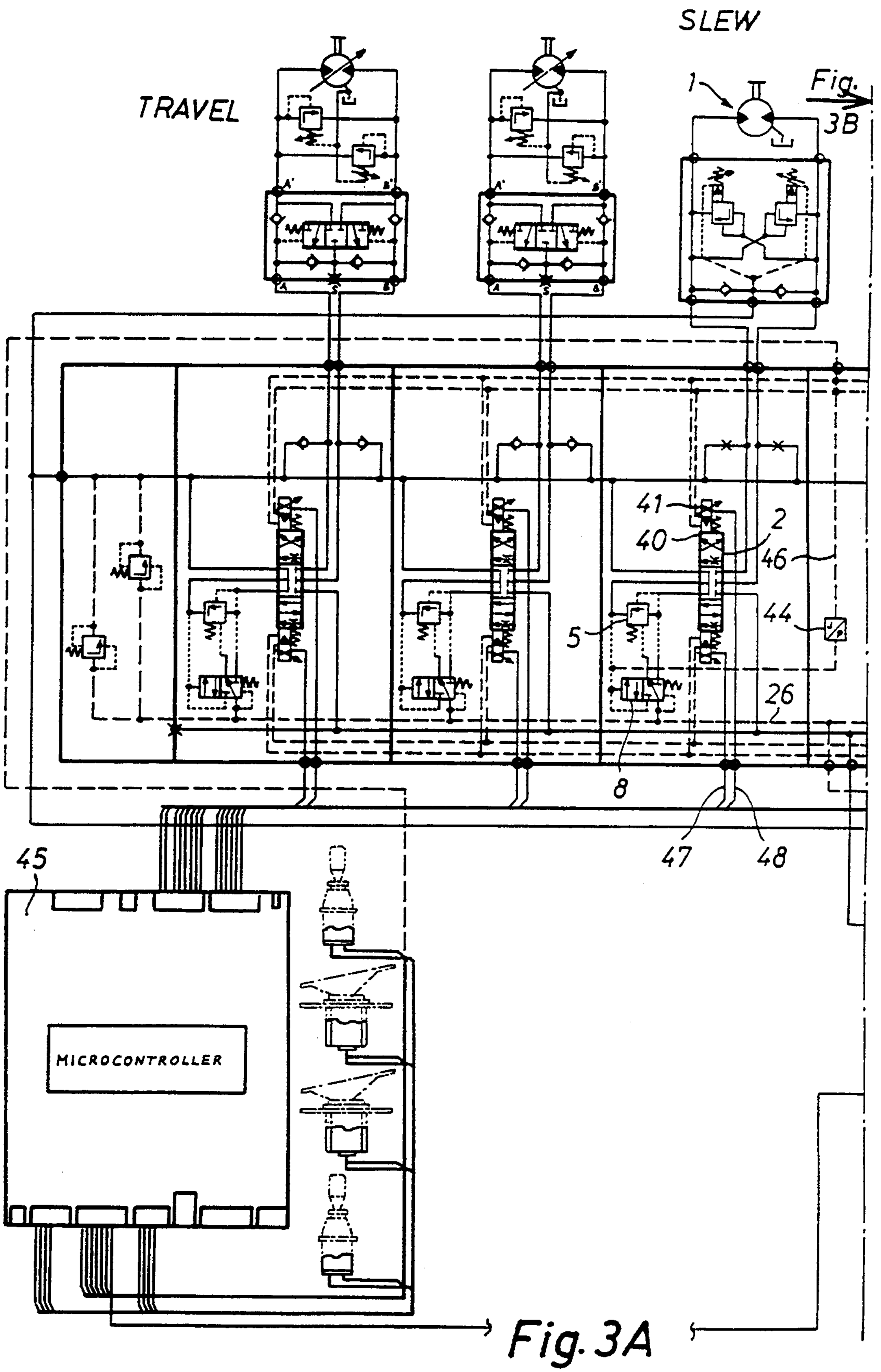
FIGS. 3A and 3B together show a circuit diagram of an excavator control in which the pressure adjustment is effected by electrical signals influencing the control position of the control valve.
Figure 3B:
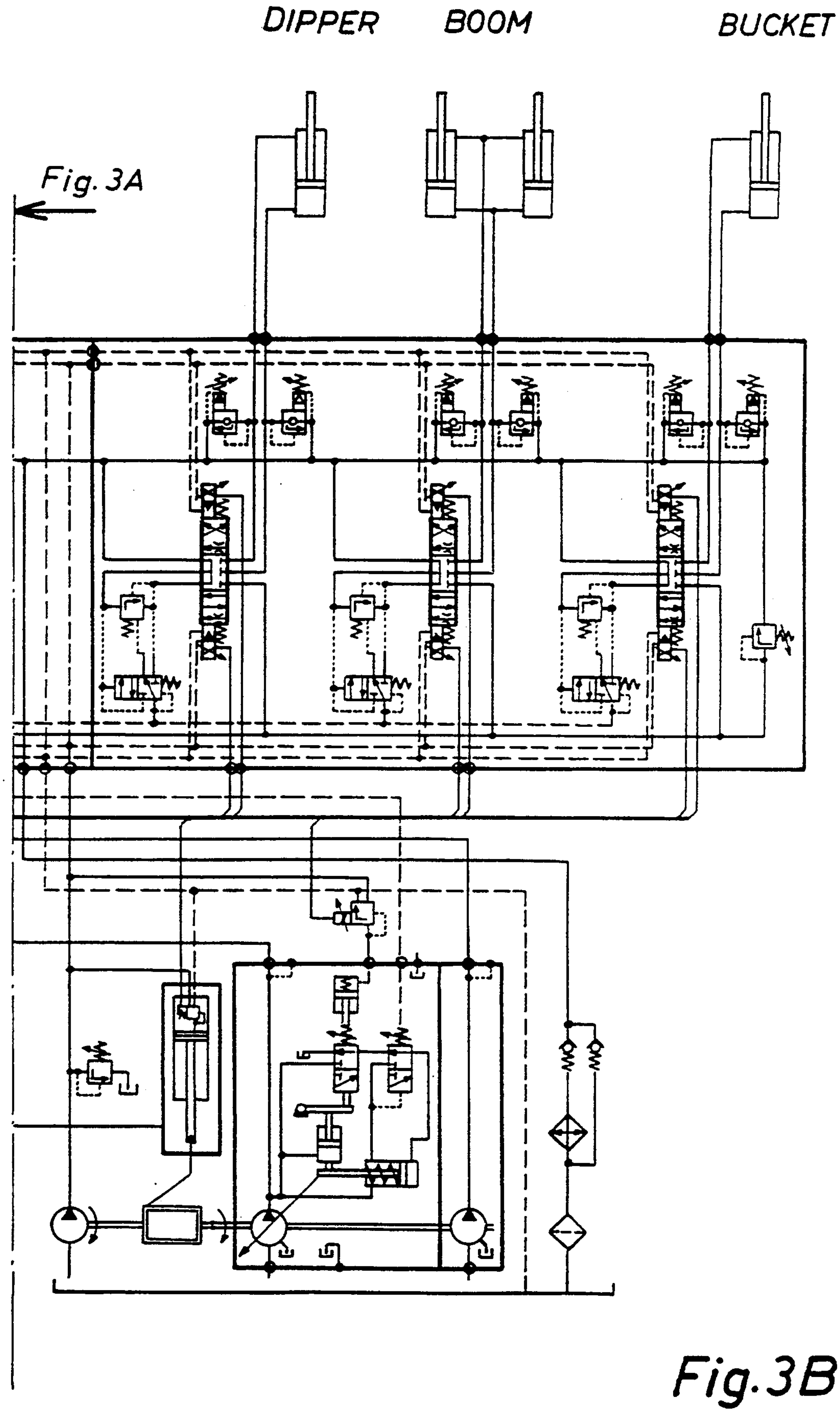

In FIGS. 1 and 2 the same reference numerals are used to denote functionally corresponding parts. This is also true for the embodiment shown in FIG. 3. In this embodiment the control pressure for the control valve 2 is generated by electrical signals using pressure control valves 40, the control pressure adjustment of which being effected by the proportional solenoid (magnet). The pressure control valve 40 and the proportional valve are flanged as a unit directly to the respective control sides of control valve 2. In this embodiment as well as in the embodiments of FIGS. 1 and 2, the load pressure is tapped off by means of the control line 26 at the output of the pressure compensator 5 associated with the control valve 2 and is directed to a signal transducer 44 in which the pressure signal is transformed into an electrical signal and is directed via the electrical control line 46 to the control device 45 via the control signal generator means 50 and is there compared as the actual signal to the desired signal determined by the control signal generator means 50.

The resulting differential signal is superimposed on the electrical signal controlling the proportional solenoid (magnet) for adjusting the control valve 2 to achieve the set or given load pressure. The electrical control lines leading from the control device 45 to the proportional valves at the control valve 2 bear the reference numerals 47 and 48.

In the figures, only those parts of the entire excavator control are described which are necessary for understanding the present invention.

Thus, the invention provides for an apparatus for adjusting the pressure of working fluid supplied to the load or user via a hydraulically actuatable control valve, wherein comparator means compare a given control pressure for the control valve determining the desired value for the load pressure with the predominant (present) load pressure and wherein the resulting pressure differential is used as a signal for re-adjusting the control valve or for re-adjusting a pressure compensator positioned upstream of the control valve with respect to the direction of the flow of working fluid flowing to the user.

We claim:

1. Apparatus for adjusting a pressure of working fluid supplied to a load via a hydraulically actuatable control valve (2), said apparatus comprising:

comparator means (25) for comparing a given control pressure for the control valve (2) with actual load pressure, resulting in a pressure differential and forming a signal for adjusting said control valve, said given control pressure determining a desired value for load pressure, wherein said comparator means (25) comprises a 2-way directional valve having a spool, said control pressure for the control valve is applied in one direction of displacement of the spool of said directional valve and the load pressure is applied in an opposite direction of displacement of said spool, and an input of the 2-way directional valve is connected to a control side of the control valve (2) whereas an output of the two-way directional valve is connected to a reservoir.

2. Apparatus as set forth in claim 1, wherein control fluid fed to the control valve (2) flows through a throttle (18, 19) and wherein the input of the 2-way directional valve is connected to an area between the throttle and the control valve.

3. Apparatus as set forth in claim 2, wherein a flow cross section of the 2-way directional valve is variable proportionally to the control pressure.

4. Apparatus as set forth in claim 1, wherein a control surface of the 2-way valve (25) exposed to the load pressure is smaller in size than a control surface exposed to the control pressure and wherein the control spool of the 2-way directional valve has the load pressure applied in a direction towards opening and has the control pressure applied in a direction towards closing.

5. Apparatus as set forth in claim 1, wherein the comparator means comprises an electrical control device (45) to which the control pressure for the control valve (2) is supplied as an electrical signal and which compares said input signal with the present load pressure signal (44) also present as an electrical signal and wherein the differential is superimposed on the signal leading to the electrical control elements (41) for adjusting the control pressure for the control valves.

6. Apparatus for adjusting a pressure of working fluid supplied to a hydraulic load via a hydraulically actuatable control valve, wherein the working fluid for the hydraulic load is supplied to the control valve via a pressure compensator (30), one control side of said pressure compensator being connected to pump pressure and another control side of said pressure compensator being connected to load pressure, the apparatus comprising:

comparator means (25) for comparing a given control pressure for the pressure compensator (30) with present load pressure, resulting in a pressure differential and forming a signal for adjusting said control valve, said given control pressure determining a desired value for load pressure, wherein said comparator means (25) comprises a 2-way directional valve having a spool, said control pressure for the control valve is applied in one direction of displacement of the spool and the load pressure is applied in an opposite direction of displacement of the spool, and an input of the 2-way directional valve is connected to said another control side of the pressure compensator whereas an output of the 2-way directional valve is connected to a reservoir.

7. Apparatus as set forth in claim 6, wherein a throttle (31) is provided in a connecting area between the another control side of the pressure compensator (30) and the load, and wherein the input of the 2-way directional valve is connected in a connecting area (34) between the throttle (31) and the another control side of the pressure compensator.

* * * * *